(12) United States Patent
Lockhart et al.

(10) Patent No.: US 12,314,526 B2
(45) Date of Patent: May 27, 2025

(54) INFORMATION PROCESSING APPARATUS, CONTROL METHOD FOR INFORMATION PROCESSING APPARATUS, AND PROGRAM FOR DISPLAYING PROCESSING STEP PROGRESS

(71) Applicant: Sony Interactive Entertainment Inc., Tokyo (JP)

(72) Inventors: Julie Lockhart, San Mateo, CA (US); Erika Ohno, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 250 days.

(21) Appl. No.: 17/144,836

(22) Filed: Jan. 8, 2021

(65) Prior Publication Data

US 2021/0216171 A1 Jul. 15, 2021

Related U.S. Application Data

(60) Provisional application No. 62/961,283, filed on Jan. 15, 2020.

(51) Int. Cl.
*G06F 3/0481* (2022.01)
*G06F 3/04847* (2022.01)
*G06F 3/04886* (2022.01)

(52) U.S. Cl.
CPC ........ *G06F 3/0481* (2013.01); *G06F 3/04847* (2013.01); *G06F 3/04886* (2013.01)

(58) Field of Classification Search
CPC ............... G06F 3/0481; G06F 3/04847; G06F 3/04886; G06F 3/048
See application file for complete search history.

(56) References Cited

U.S. PATENT DOCUMENTS 9,378,006 B2 6/2016 Fujii
10,871,870 B2 12/2020 Liu
(Continued)

FOREIGN PATENT DOCUMENTS

JP 2005165530 A 6/2005
JP 2014059647 A 4/2014
(Continued)

OTHER PUBLICATIONS

Wikipedia, Definition of Parallel Processing (Year: 2022).*
(Continued)

*Primary Examiner* — Jeanette J Parker
(74) *Attorney, Agent, or Firm* — Kilpatrick Townsend & Stockton LLP

(57) ABSTRACT

An information processing apparatus that sequentially executes a plurality of information processing steps, includes: a management section that manages the plurality of information processing steps by dividing the plurality of information processing steps into a plurality of processing groups; an information processing section that processes at least some of the plurality of information processing steps included in each of the plurality of processing groups in a selection order according to a predetermined rule, for each of the plurality of processing groups; a group progress image generating section that generates a progress display image representing a progress of processing of the plurality of information processing steps included in each of the plurality of processing groups; and a display control section that outputs and displays a screen in which the generated progress display image for each of the plurality of processing groups is arranged at each predetermined position in one screen.

14 Claims, 8 Drawing Sheets

(56) References Cited

U.S. PATENT DOCUMENTS

| | | | |
|---|---|---|---|
| 2007/0121150 A1* | 5/2007 | Kobayashi | H04N 1/32106 358/1.15 |
| 2008/0195948 A1* | 8/2008 | Bauer | G06F 3/048 715/719 |
| 2009/0164933 A1* | 6/2009 | Pederson | G05B 19/409 715/772 |
| 2010/0031248 A1* | 2/2010 | Sonkin | G06F 8/61 717/174 |
| 2014/0215454 A1 | 7/2014 | Fujii | |
| 2016/0028906 A1* | 1/2016 | Nishino | H04N 1/00344 358/1.15 |
| 2016/0335134 A1* | 11/2016 | Gupta | G06F 9/5033 |
| 2017/0048117 A1 | 2/2017 | Tsuchiya | |
| 2018/0234562 A1* | 8/2018 | Kamekawa | H04N 1/32614 |
| 2019/0018548 A1 | 1/2019 | Liu | |

FOREIGN PATENT DOCUMENTS

| | | |
|---|---|---|
| JP | 2014146113 A | 8/2014 |
| JP | 2017037482 A | 2/2017 |
| JP | 2019507433 A | 3/2019 |
| JP | 2019188761 A | 10/2019 |

OTHER PUBLICATIONS

Wikipedia, Definition of Parallel Computing (Year: 2022).*
Technopedia, Definition of Parallel processing (Year: 2022).*
GeeksforGeeks, Definition of Parallel Processing (Year: 2022).*
Notice of Reasons for refusal for corresponding JP Application No. 2021-002643, 6 pages, dated Nov. 18, 2021.
Notice of Reasons for refusal for corresponding JP Application No. 2021-002643, 6 pages, dated May 6, 2022.

* cited by examiner

F I G . 2
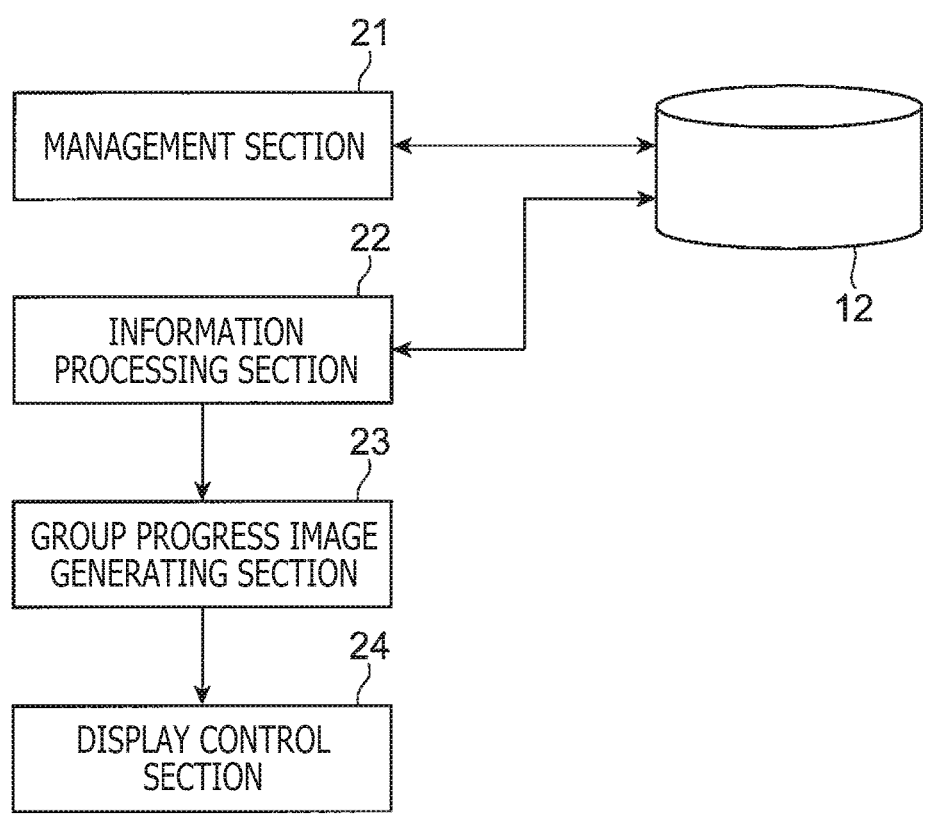

FIG.3

| GROUP IDENTIFIER | STEP IDENTIFIER | CONTENT OF INFORMATION PROCESSING STEP | PROGRESS INFORMATION | ... |
|---|---|---|---|---|
| B1 | aaaa | bbbb ... | | ... |
| B1 | cccc | dddd ... | 33% | ... |
| | | | | |

INPUT OF PASSWORD

INFORMATION PROCESSING APPARATUS, CONTROL METHOD FOR INFORMATION PROCESSING APPARATUS, AND PROGRAM FOR DISPLAYING PROCESSING STEP PROGRESS

BACKGROUND

The present disclosure relates to an information processing apparatus, a method for controlling the information processing apparatus, and a program.

As a method for indicating the progress of information processing, what is called a progress bar is known. The progress bar can exhibit the progress of processing to the user by indicating the ratio of size of the downloaded data to the total size of the file to be downloaded, for example.

SUMMARY

However, in the above-mentioned existing progress bar, in the case where the information processing to be executed has, for example, three stages of initial setting of an apparatus, creation of an account, and user setting, and furthermore a plurality of information processing steps is executed at each stage (for example, a plurality of information processing steps such as input of a user name, confirmation, input of a password, confirmation, . . . is executed in the creation of an account), the progress is displayed by one progress bar regardless of which one of the above three stages the processing has progressed to, and it is difficult to understand how many information processing steps have been completed in each stage. To be specific, it is difficult for the user to understand how many information processing steps are to be executed to complete the creation of the account.

The present disclosure has been made in view of the above circumstances, and it is desirable to provide an information processing apparatus that can present the progress of processing in each stage in an easy-to-see manner when sequentially executing a plurality of information processing steps that can be divided into a plurality of stages (processing groups).

According to an embodiment of the present disclosure, there is provided an information processing apparatus that sequentially executes a plurality of information processing steps, and the information processing apparatus includes a management section that manages the plurality of information processing steps by dividing the steps into a plurality of processing groups, an information processing section that processes at least some of the information processing steps included in the processing group in a selection order according to a predetermined rule for each processing group, a group progress image generating section that generates a progress display image representing the progress of processing of the information processing steps included in the processing group, and a display control section that outputs and displays a screen in which the generated progress display image for each processing group is arranged at each predetermined position in one screen.

According to the embodiment of the present disclosure, the progress of processing at each stage (processing group) can be presented in an easy-to-see manner.

BRIEF DESCRIPTION OF THE DRAWINGS

FIG. 2 is a functional block diagram illustrating an example of the information processing apparatus according to the embodiment of the present disclosure;

FIG. 3 is an explanatory diagram illustrating a setting example of information processing steps managed by the information processing apparatus according to the embodiment of the present disclosure;

DETAILED DESCRIPTION OF THE PREFERRED EMBODIMENT

Figure 1:
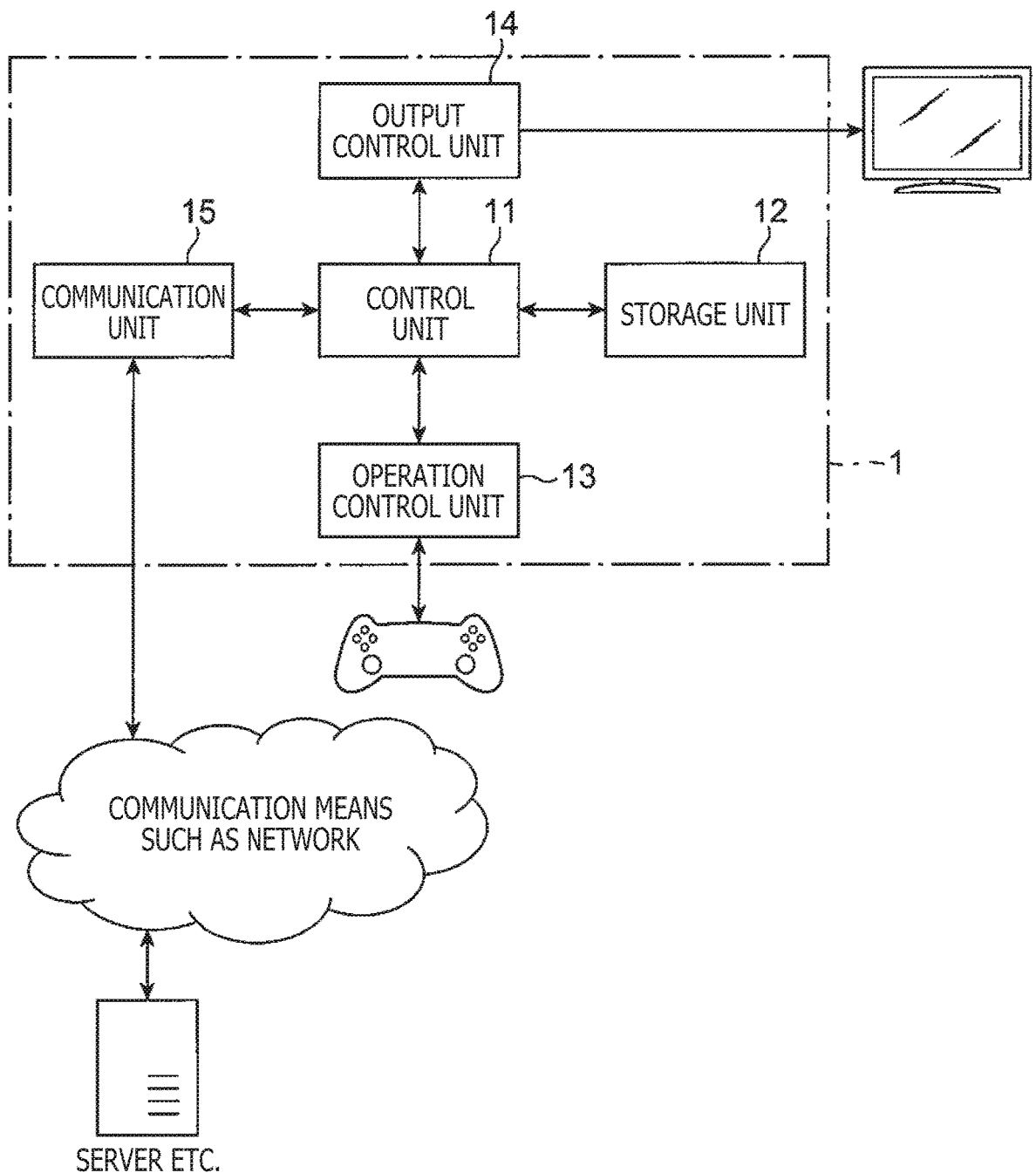
FIG. 1 is a block diagram illustrating a configuration example of an information processing apparatus according to an embodiment of the present disclosure.

An embodiment of the present disclosure will be described with reference to the drawings. An information processing apparatus 1 according to the embodiment of the present disclosure is, for example, a home game console, and as illustrated in FIG. 1, includes a control unit 11, a storage unit 12, an operation control unit 13, an output control unit 14, and a communication unit 15.

The control unit 11 is a program control device such as a central processing unit (CPU), and operates according to a program stored in the storage unit 12. The control unit 11 executes processing of a game application and the like, and in the example of the present embodiment, sequentially executes a plurality of information processing steps defined by a program. Further, the control unit 11 also manages the plurality of information processing steps by dividing the steps into a plurality of processing groups.

Then, the control unit 11 processes at least some of the information processing steps included in the processing group in the selection order according to a predetermined rule (step execution order rule) for each processing group, and generates a progress display image representing the progress of processing of the information processing step included in the processing group.

Then, the control unit 11 controls the output control unit 14 so as to output and display a screen in which the generated progress display image for each processing group is arranged at each predetermined position in one screen. Detailed operation of the control unit 11 will be described later.

The storage unit 12 is a memory device, a disk device, or the like, and holds a program executed by the control unit 11. The program may be provided while being stored in a non-transitory computer-readable recording medium, and stored in the storage unit 12. Further, in the present embodiment, the storage unit 12 also operates as a work memory of the control unit 11.

The operation control unit 13 communicates wirelessly or by wire with an input apparatus of the game controller or the like, and receives information indicating the content of the instruction operation performed by the user on the input apparatus, thereby outputting the information to the control unit 11.

The output control unit 14 is connected to, for example, a display device such as a home television, and causes the display device to output and display an image according to an instruction input from the control unit 11. The communication unit 15 is a network interface or the like, and communicates with a server or the like communicably connected via a network according to an instruction input from the control unit 11.

In the present embodiment, the control unit 11 executes a program stored in the storage unit 12 in order to sequentially execute a plurality of information processing steps, thereby achieving a configuration functionally including a management section 21, an information processing section 22, a group progress image generating section 23, and a display control section 24 as illustrated in FIG. 2.

The management section 21 manages a plurality of information processing steps by dividing the steps into a plurality of processing groups. To be specific, in an example of the present embodiment, as illustrated in FIG. 3, a unique step identifier is assigned to each information processing step, and the step identifiers of the information processing steps included in the processing group are stored and held in the storage unit 12 in association with the information for identifying a processing group (group identifier uniquely assigned to each processing group).

Further, in the present embodiment, it is assumed that a rule (step execution order rule) that defines the execution order of the information processing steps is set and stored in the storage unit 12. The step execution order rule can be implemented as a program executed by the control unit 11, for example.

The step execution order rule may simply represent the execution order of a series of information processing steps, or may be set such that the subsequent information processing step differs according to the result of the execution of a certain information processing step. For example, in the information processing step that requests the user to "log in to server," an example is described in which the user is presented with three options to select "log in," "set up new account," and "continue without logging in."

Here, as the settings in the case where the user selects "log in," an information processing step of accepting "input of user name," an information processing step of accepting "input of password," and an information processing step of attempting to log in to the server with the input user name and password are executed thereafter, for example.

Further, as a setting in the case where the user selects "set up new account," an information processing step of accepting "input of user name," an information processing step of accepting "input of password," and an information processing step of attempting to register a new user in the server with the input user name and password are executed thereafter, for example.

Furthermore, as the setting in the case where the user selects "continue without logging in," for example, an information processing step of displaying "guidance information that login to the server can be set later" is executed.

In addition, here, it is assumed that the division into the processing groups is performed in accordance with the rule stipulating that "an information processing step in one processing block B1 does not shift to an information processing step in another processing block B2 without completing the processing of the processing block B1."

That is, going back and forth between information processing steps in a plurality of processing groups, such as a transition procedure in which information processing step S21 included in the processing group B2 is executed as a process subsequent to information processing step S11 included in the processing group B1 and thereafter the processing returns to information processing step S12 included in the processing group B1 to continue processing, is prohibited.

Further, in an example of the present embodiment, progress information to be set when the execution of the information processing step is completed is recorded in association with at least some of the information processing steps included in each processing group. For example, in processing blocks that target the user's "log in to server," it is assumed that the information processing step to be executed first is the information processing step of requesting "log in to server," and here, as the setting in the case where the user selects "log in," the case is considered where an information processing step of accepting "input of user name," an information processing step of accepting "input of password," and an information processing step of attempting to log in to the server with the input user name and password are executed after that.

At this time, in the information processing step of accepting "input of user name," progress information "33%" indicating that ⅓ of the whole processing is completed is set. In addition, in the information processing step of accepting input of password," progress information "66%" indicating that ⅔ of the entire processing is completed is set. Then, in the processing blocks that target "log in to server," progress information "100%" is set in advance in an information processing step having no subsequent information processing step (for example, an information processing step of indicating that "login to the server is completed" or an information processing step of indicating "guidance information that login to the server can be set later").

The information processing section 22 processes, for each processing group, at least some of the information processing steps included in the processing group in the order determined by the predetermined step execution order rule. In the example of the present embodiment, the processing groups are subjected to selection in the order determined by the preset group selection order rule, and at least some of the information processing steps included in the selected processing group are processed in the order of selection in accordance with the predetermined step execution order rule.

To be specific, when selecting the processing group to be processed in accordance with the step execution order rule, the information processing section 22 acquires the step execution order rule of the information processing steps included in the selected processing group. Then, the processing of the information processing steps is executed in the order of the step execution rule.

When completing the execution of processing of the information processing step, the information processing section 22 outputs the progress information to the group progress image generating section 23 in the case where the progress information is associated with the information processing step in which the execution is completed.

Then, when there is no subsequent information processing step defined by the step execution order rule, the information processing section 22 determines that the processing in the selected processing group has been completed, and selects a processing group to be processed next according to the predetermined group selection order rule. Note that in the case of no next processing group to be processed according to the group selection order rule (in the case where processing has been completed for all processing groups), the processing ends.

Figure 4A:
FIGS. 4A and 4B are explanatory diagrams illustrating examples of progress display images generated by the information processing apparatus according to the embodiment of the present disclosure.

The group progress image generating section 23 generates a progress display image representing the progress of processing of the information processing steps included in the processing group selected by the information processing section 22. To be specific, when receiving the progress information output by the information processing section 22, the group progress image generating section 23 generates a progress display image in which the color of a bar is changed for the area corresponding to the progress information in the figure of the rounded rectangular bar having a predetermined length on the basis of the value of the progress information, as illustrated in FIG. 4A, for example. For example, in the case where the length is 100 pixels and the progress information is "33%," a bar image in which the portion of the length 33 pixels from the left end is made different in color from the other portion is generated.

Figure 4B:

Further, the progress display image may have an array of a plurality of (for example, ten) circles, as illustrated in FIG. 4B. In such an example, the group progress image generating section 23 fills the number of the circles corresponding to the progress information α (expressed as a percentage) (for example, [N×α/100] circles among N circles, and note that [x] is a maximum integer not exceeding x) with a predetermined color, and does not fill other circles.

Furthermore, the progress display image may be a pie chart, or any image as long as the value of the progress information can be expressed.

Figure 5:
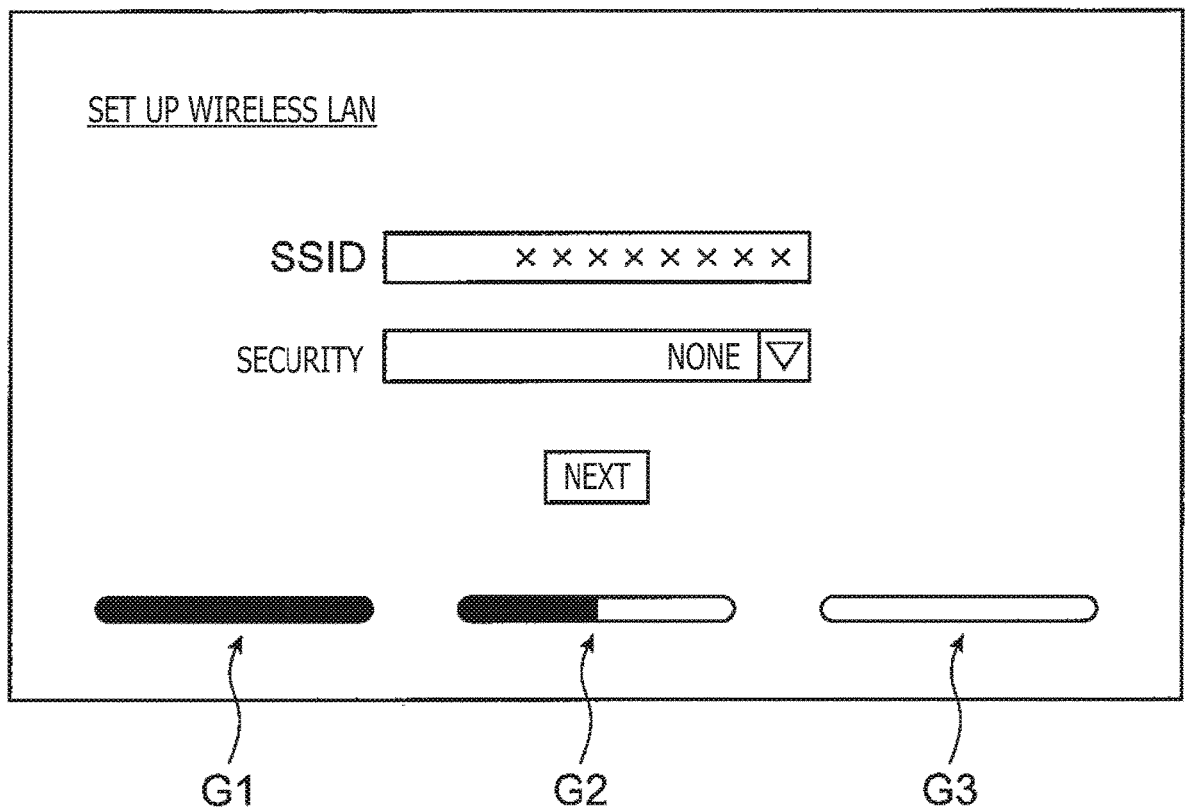
FIG. 5 is an explanatory diagram illustrating an example of a display screen output by the information processing apparatus according to the embodiment of the present disclosure.

The display control section 24 generates a screen in which the progress display image for each processing group is arranged at each predetermined position in one screen, and outputs the screen to the output control unit 14. The screen generated by the display control section 24 displays corresponding progress display images G1, G2, and G3 arranged in a line in the order determined by the group selection order rule of the processing groups, as illustrated in FIG. 5, for example.

[Operation]

The information processing apparatus 1 according to the embodiment of the present disclosure basically has the above configuration, and operates as follows. Note that in the following example, it is assumed that the information processing apparatus 1 executes information processing steps that are divided into three processing groups of initial setting of the apparatus (processing group B1), login to a server (processing group B2), and user setting (processing group B3).

Figure 6:
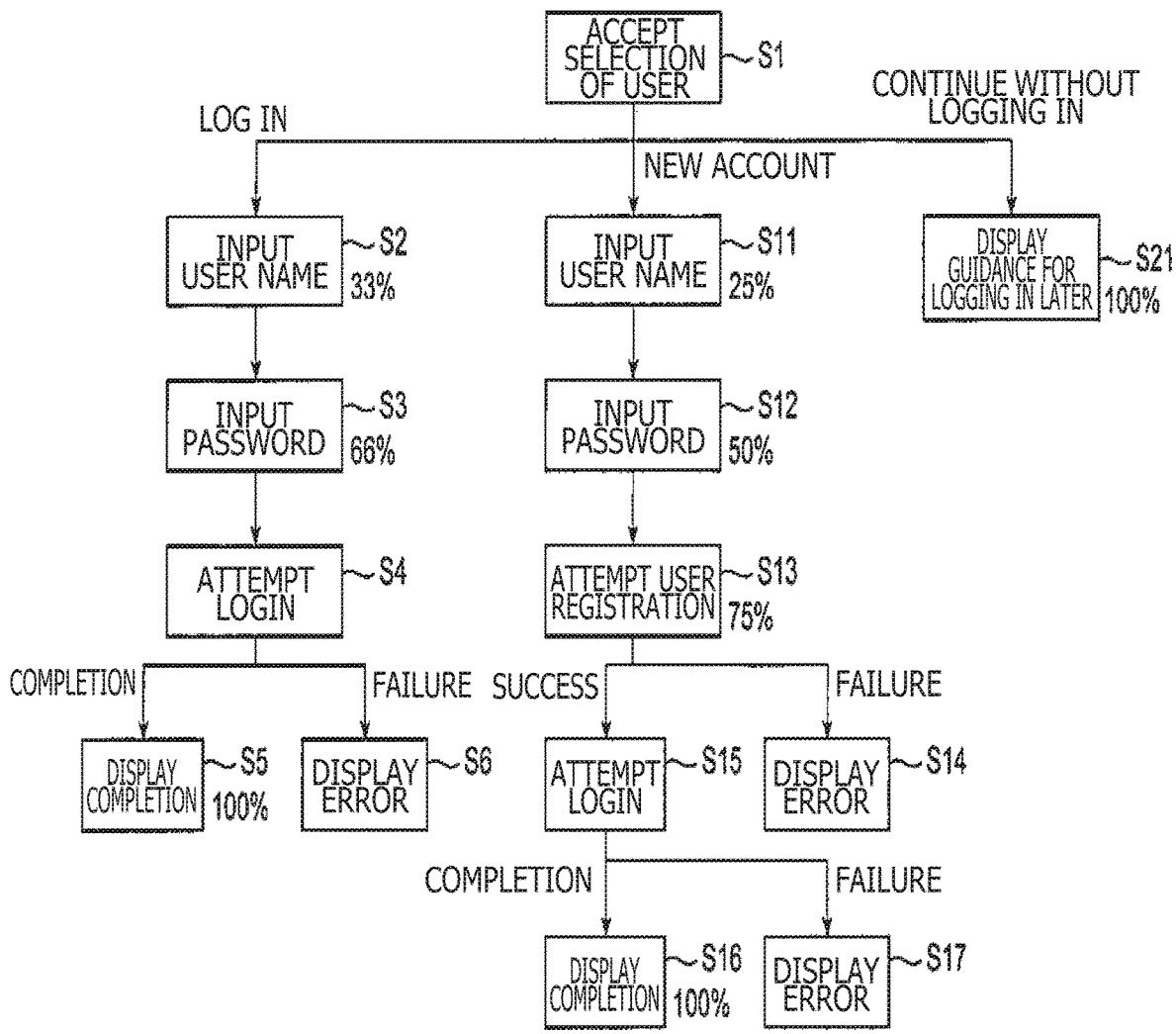
FIG. 6 is a flowchart illustrating an example of setting the processing order of information processing steps in processing blocks in the information processing apparatus according to the embodiment of the present disclosure.

In addition, as illustrated in FIG. 6, the processing group for logging in to the server includes an information processing step, which is set to be executed first according to the step execution order rule, for presenting the three options of "log in," "set up new account," and "continue without logging in" in order to allow user's selection (S1).

Further, the processing group includes, as information processing steps executed in the case where the user selects "log in" in information processing step S1, an information processing step of accepting "input of user name" (S2), an information processing step of accepting "input of password" (S3), an information processing step of attempting to log in to the server with the input user name and password (S4), an information processing step of indicating that the login is completed in the case of a successful login (S5), and an information processing step of indicating that an error has occurred in the case of an unsuccessful login (S6).

Further, the processing group includes, as information processing steps executed in the case where the user selects "set up new account" in information processing step S1, an information processing step of accepting "input of user name" (S11), an information processing step of accepting "input of password" (S12), an information processing step of attempting to register a new user in the server with the input user name and password (S13), an information processing step of indicating that an error has occurred in the case where the registration of a new user fails (S14), an information processing step of attempting to log in to the server with the registered user name and password in the case where a new user can be registered (S15), an information processing step of indicating that the login is completed in the case of a successful login (S16), and an information processing step of indicating that an error has occurred in the case of an unsuccessful login (S17).

Further, the processing group may include an information processing step executed in the case where the user selects "continue without logging in" in information processing step S1. That is, the processing group includes an information processing step of displaying "guidance information that login to the server can be set later" (S21) as the information processing step at this time.

Note that values of 33% and 66% are respectively associated with steps S2 and S3 as progress information. Further, pieces of information for 25%, 50%, and 75% are respectively associated with steps S11, S12, and S13 as progress information. Further, it is assumed that information for 100% is associated with each of steps S5, S16, and S21 as progress information.

Further, in the following description, it is assumed that setting for execution in the order of the processing groups B1→B2→B3 is made, as the group selection order rule that determines the processing order of the processing groups.

The information processing apparatus 1 of the present embodiment stores the above settings, and the control unit 11 conducts operations while referring to the settings. That is, the control unit 11 of the information processing apparatus 1 makes a selection from the processing groups in the order determined in accordance with the group selection order rule set in advance, and processes at least some of the information processing steps included in the selected processing group in the order of selection of the preset step execution order rule. Therefore, in such an example, first, at least some of the information processing steps included in the processing group B1 are processed in the order of selection in accordance with the predetermined step execution order rule.

Hereinafter, an example of the operation when the processing of initial setting of the apparatus (processing group B1) is completed and the processing of logging in to the server (processing group B2) is performed will be specifically described. The control unit 11 selects a processing group to be processed in accordance with the step execution order rule set for the information processing step of the processing group B2.

Here, since the information processing step that presents three choices of "log in," "set up new account," and "continue without logging in" and allows the user to make a selection (S1) is set, as the information processing step to be executed first, the control unit 11 presents the user with three options of "log in," "set up new account," and "continue without logging in" to prompt the user to make the selection.

When accepting the user's selection operation from the operation control unit 13, the control unit 11 executes the following processing according to the content of the selection. Here, for example, an example in the case where the user has selected "log in" will be described.

In such an example, the control unit 11 selects the information processing step that accepts "input of user name" (S2) as the information processing step to be executed next in accordance with the step execution order rule, and displays the screen requesting "input of user name" to encourage the input of the user. Here, when the user inputs the user name, the control unit 11 generates the progress display image G2 in which, in a figure of a bar having a rounded rectangular shape and a predetermined length, the color of the bar is changed for the area corresponding to the progress information, on the basis of the progress information (33%) associated with the information processing step (S2). Then, the control unit 11 generates a screen in which the progress display images G1, G2, and G3 corresponding to the processing groups B1, B2, and B3 respectively are arranged at respective predetermined positions in one screen, and outputs the images to the output control unit 14.

Further, according to the step execution order rule, the control unit 11 selects and executes the information processing step that accepts "input of password" (S3) as the information processing step to be executed next. Here, the control unit 11 displays a screen for requesting "input of password" to prompt the input of the user.

Figure 7A:
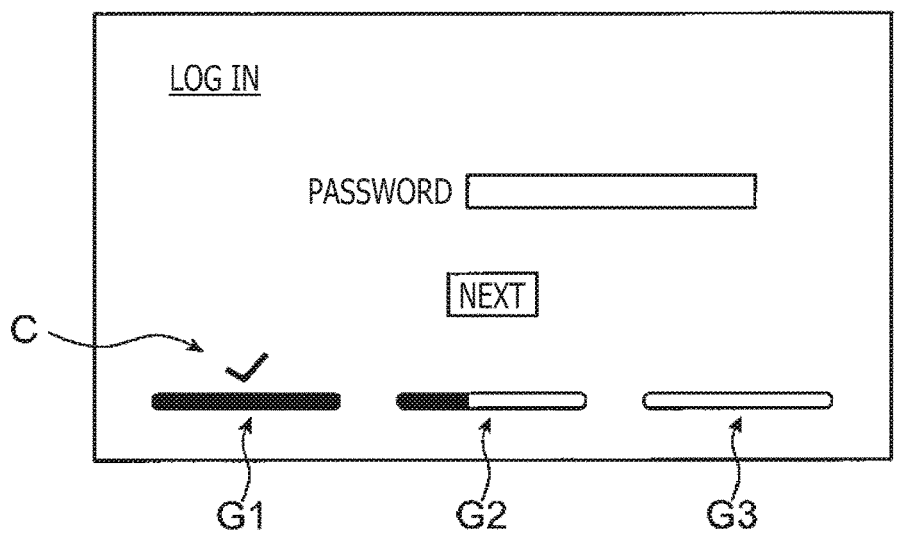
FIGS. 7A to 7C are explanatory diagrams illustrating an example of screen transition during execution of processing blocks by the information processing apparatus according to the embodiment of the present disclosure.

At this stage, as illustrated in FIG. 7A, the screen output for display by the information processing apparatus 1 is one in which the progress display images G1, G2, and G3 are arranged and displayed in a row in the horizontal direction in the lower part of the screen for requesting "input of password," for example. Since the processing of the processing group B1 has already been completed, the corresponding progress display image G1 has all areas filled with a predetermined color. Further, the progress display image G2 is filled with a predetermined color for an area of 33% from the left end, and the remaining area is not filled with the predetermined color (for example, only the contour line of a rounded rectangle which is a progress display image). The progress display image G3 is an image that is entirely blank without a predetermined color.

Note that, as illustrated in the example of FIG. 7A, the control unit 11 may display an image predetermined as one indicating the completion of the processing, in the vicinity of a progress display image corresponding to a processing group in which the processing progress of information processing steps included therein has been completed, among processing groups. FIG. 7A exhibits an example which displays a check mark image (C) defined as completion in a position above and adjacent to the progress display image G1 corresponding to the processing group B1 in which the processing progress of the information processing steps included in the processing group is completed.

When the user inputs a password on the screen of FIG. 7A, the control unit 11 attempts to log in to the server with the input user name and password (S4) in accordance with the step execution order rule as an information processing step to be executed next. Further, at this time, the control unit 11 generates the progress display image G2 in which the color of a bar for the area corresponding to the progress information is changed in the figure of the rounded rectangular bar having a predetermined length, on the basis of the progress information (66%) associated with the processed information processing step (S3), and generates a screen in which the progress display images G1, G2, and G3 corresponding to the processing groups B1, B2, and B3 respectively are arranged at respective predetermined positions on one screen, and then outputs the screen to the output control unit 14.

Figure 7B:
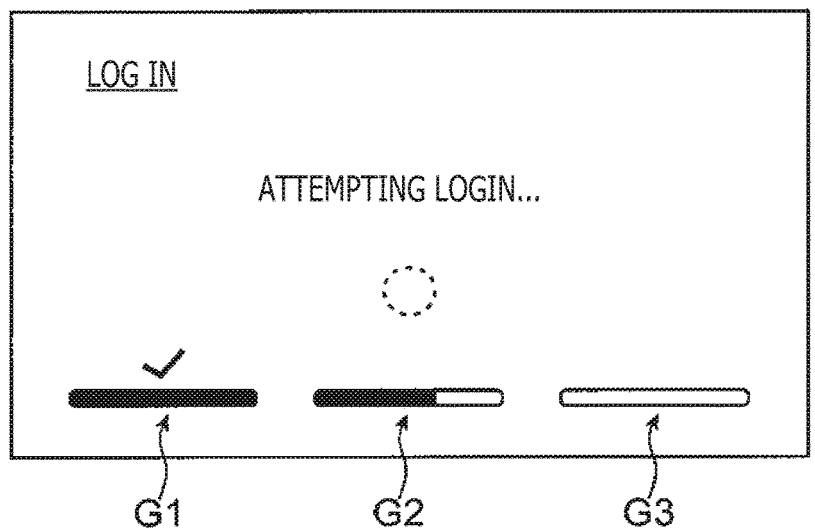

At this stage, the screen output for display by the information processing apparatus 1 displays the progress display images G1, G2, and G3 arranged in a row in the horizontal direction at the bottom of the screen indicating that login is being attempted, as illustrated in FIG. 7B. Compared to the example in FIG. 7A, the progress display image G2 is filled with a predetermined color for an area of 66% from the left end, and the remaining area is not filled with the predetermined color.

Then, the control unit 11 determines whether or not the login to the server has succeeded in the information processing step (S4), and in the case where it is determined that the login is successful, the control unit 11 executes the information processing step of indicating that the login is completed (S5), as an information processing step to be executed next, in accordance with the step execution order rule.

At this time, the control unit 11 generates the progress display image G2 in which the color of a bar is changed for the area corresponding to the progress information (here, entire area) in the figure of the rounded rectangular bar having a predetermined length, on the basis of the progress information (100%) associated with the processed information processing step (S5), and generates a screen in which the progress display images G1, G2, and G3 corresponding to the processing groups B1, B2, and B3 respectively are arranged at respective predetermined positions in one screen, and then outputs the screen to the output control unit 14.

Figure 7C:
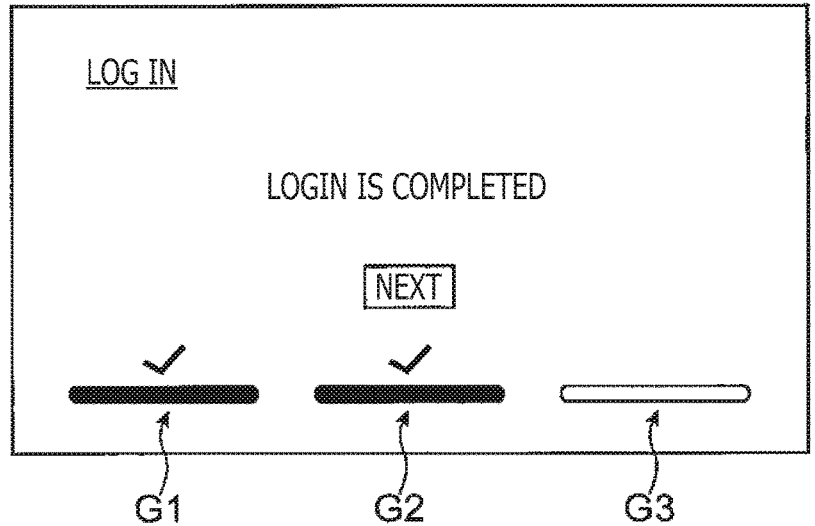

At this stage, as illustrated in FIG. 7C, the screen output for display by the information processing apparatus 1 displays a message indicating that the login is completed and displays the progress display images G1, G2, and G3 arranged in a row in the horizontal direction below the image of a button for instruction to continue executing the processing of the next processing group. Compared to the examples of FIGS. 7A and 7B, the progress display image G2 here is an image in which the entire is filled with a predetermined color. Further, at this stage, since the processing of the processing group B2 is completed (the progress information has reached 100%), the control unit 11 may display the image (C) of a check mark, which is defined as indication of completion on the upper side of and adjacently to the progress display image G2 corresponding to the processing group B2.

Further, in the example of the operation of the present embodiment, information processing steps S6, S11 to S17, and S21 are not executed, but the processing of the processing group B2 becomes completed.

Further, in an example of the present embodiment, a character string or an image (icon or the like) representing the content of the information processing executed in the information processing step may be stored in the storage unit 12 while being associated with at least some of the information processing steps.

Figure 8A:
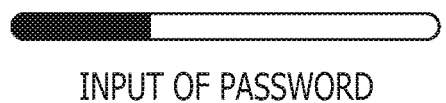
FIGS. 8A to 8C are explanatory diagrams illustrating other examples of the progress display images generated by the information processing apparatus according to the embodiment of the present disclosure.

In such a case, when a character string or an image representing the content of the information processing executed in an information processing step is associated with the information processing step to be executed, the control unit 11 draws and displays the character string or the image near the progress display image corresponding to the selected processing group (for example, immediately below the progress display image) (FIG. 8A).

Figure 8B:

Further, when there is an error during execution of each information processing step, the control unit 11 may display an image predetermined as an image indicating that an error has occurred, near the progress display image corresponding to the processing group including the information processing step (for example, arranged above the progress display image) (FIG. 8B). When an image indicating that an error has occurred is displayed in such a way, the corresponding progress display image may be an image in the case of "0%" of the progress information.

Figure 8C:

Furthermore, in the examples up to this point, examples of drawing various images and character strings in the vicinity of the progress display image have been described, however, an image indicating error occurrence, an image indicating completion, or the like may be displayed by being overlapped with the progress display image, for example (FIG. 8C).

In addition, the progress display image related to the currently selected processing group may be displayed in a manner distinguishable from the progress display images related to other processing groups. For example, the contour line of the progress display image related to the selected processing group may be set to a color having a higher brightness than the contour lines of the progress display images related to other processing groups.

Further, in the above description, the control unit 11 selects and executes the processing groups in a predetermined order, but the selection order of the processing groups may be designated by the user.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus that sequentially executes a plurality of information processing steps, the information processing apparatus comprising:
   a computer including a central processing unit;
   a memory device including a non-transitory computer-readable recording medium storing program including instructions coupled to and executable by the central processing unit comprising:
      a management section operating to manage the plurality of information processing steps by dividing the plurality of information processing steps into a plurality of processing groups;
      an information processing section:
         (i) that operates to execute a processing flow that processes a step among the plurality of information processing steps that accepts a user input;
         (ii) thereafter processes the plurality of processing groups in a processing order according to a group selection order rule; and
         (iii) where at least some of the plurality of information processing steps included in each of the plurality of processing groups are processed in a selection order according to a step execution order rule, such that according to the user input, the processing flow branches to any one of a plurality of different, alternative processing steps in a respective one of the plurality of processing groups;
      a group progress image generating section operating to execute a progress display image representing a progress of processing of the plurality of information processing steps associated with user input included in each of the plurality of processing groups, where an indication of a level of completion of the plurality of information processing steps within a given one of the plurality of processing groups is determined by reviewing respective progress information data indicating respective completion for each of the plurality of information processing steps within such given one of the plurality of processing groups, and wherein the progress display image updates in response to respective completion of an information processing step associated with user input; and
      a display control section operating to output and display a screen in which the progress display image for each of the plurality of processing groups is arranged at each predetermined position in one screen; and
      wherein each of the plurality of processing groups comprises a number of information processing steps associated with the user input, wherein the progress display image is divided into a plurality of equal portions corresponding to the number of information processing steps, and wherein each portion of the plurality of equal portions sequentially updates in response to respective completion of each information processing step.

2. The information processing apparatus according to claim 1, wherein
   the information processing section selects a processing group from the plurality of processing groups in the processing order and processes at least some of the plurality of information processing steps included in the selected processing group in the selection order according to the step execution order rule, and
   when a progress of processing of at least some of the plurality of information processing steps included in a processing group selected prior to a processing group to be selected is not completed according to the processing order, a selection of the processing group to be selected is not performed.

3. The information processing apparatus according to claim 1, wherein
   the information processing section selects a processing group from the plurality of processing groups in the processing order and processes at least some of the plurality of information processing steps included in the selected processing group in the selection order according to the step execution order rule, and
   the display control section displays a predetermined image near the progress display image corresponding to the processing group selected by the information processing section.

4. The information processing apparatus according to claim 1, wherein the display control section displays an image determined in advance as the indication of the level of completion of the processing, near the progress display image corresponding to a processing group in which the progress of the processing of the plurality of information processing steps included in the processing group is completed among the plurality of processing groups.

5. The information processing apparatus according to claim 1, wherein when there is an error in the plurality of information processing steps included in a processing group among the plurality of processing groups during information processing by the information processing section, the display control section displays an image defined in advance as an image indicating that an error has occurred, near the progress display image corresponding to the processing group.

6. The information processing apparatus according to claim 1, wherein the progress display image representing the indication of the level of completion of the progress of the processing of the plurality of information processing steps for each of the plurality of processing groups includes an image of a bar having a predetermined length, and a color of the bar is changed for an area corresponding to the progress of the processing.

7. A method for controlling an information processing apparatus that sequentially executes a plurality of information processing steps, the method comprising:
managing the plurality of information processing steps by dividing the plurality of information processing steps into a plurality of processing groups;
executing a processing flow:
(i) that processes a step among the plurality of information processing steps that accepts a user input;
(ii) thereafter processes the plurality of processing groups in a processing order according to a group selection order rule; and
(iii) where at least some of the plurality of information processing steps included in each of the plurality of processing groups are processed in a selection order according to a step execution order rule, such that according to the user input, the processing flow branches to any one of a plurality of different, alternative processing steps in a respective one of the plurality of processing groups;
generating a progress display image representing a progress of processing of the plurality of information processing steps associated with user input included in each of the plurality of processing groups, where an indication of a level of completion of the plurality of information processing steps within a given one of the plurality of processing groups is determined by reviewing respective progress information data indicating respective completion for each of the plurality of information processing steps within such given one of the plurality of processing groups, and wherein the progress display image updates in response to respective completion of an information processing step associated with user input; and
outputting and displaying a screen in which the progress display image for each of the plurality of processing groups is arranged at each predetermined position in one screen; and
wherein each of the plurality of processing groups comprises a number of information processing steps associated with the user input, wherein the progress display image is divided into a plurality of equal portions corresponding to the number of information processing steps, and wherein each portion of the plurality of equal portions sequentially updates in response to respective completion of each information processing step.

8. The method according to claim 7, further comprising:
selecting a processing group from the plurality of processing groups in the processing order and processes at least some of the plurality of information processing steps included in the selected processing group in the selection order according to the step execution order rule, wherein:
when a progress of processing of at least some of the plurality of information processing steps included in a processing group selected prior to a processing group to be selected is not completed according to the processing order, a selection of the processing group to be selected is not performed.

9. The method according to claim 7, further comprising:
selecting a processing group from the plurality of processing groups in the processing order and processes at least some of the plurality of information processing steps included in the selected processing group in the selection order according to the step execution order rule, and
displaying a predetermined image near the progress display image corresponding to the processing group selected by the information processing circuit.

10. The method according to claim 7, further comprising:
displaying an image determined in advance as the indication of the level of completion of the processing, near the progress display image corresponding to a processing group in which the progress of the processing of the plurality of information processing steps included in the processing group is completed among the plurality of processing groups.

11. The method according to claim 7, wherein when there is an error in the plurality of information processing steps included in a processing group among the plurality of processing groups during information processing, the method further comprises:
displaying an image defined in advance as an image indicating that an error has occurred, near the progress display image corresponding to the processing group.

12. The method according to claim 7, wherein the progress display image representing the indication of the level of completion of the progress of the processing of the plurality of information processing steps for each of the plurality of processing groups includes an image of a bar having a predetermined length, and a color of the bar is changed for an area corresponding to the progress of the processing.

13. A non-transitory, computer readable storage medium containing a computer program, which when executed by a computer, causes the computer to sequentially execute a plurality of information processing steps, comprising:
managing the plurality of information processing steps by dividing the plurality of information processing steps into a plurality of processing groups;
executing a processing flow:
(i) that processes a step among the plurality of information processing steps that accepts a user input;
(ii) thereafter processes the plurality of processing groups in a processing order according to a group selection order rule; and
(iii) where at least some of the plurality of information processing steps included in each of the plurality of processing groups are processed in a selection order according to a step execution order rule, such that according to the user input, the processing flow branches to any one of a plurality of different, alternative processing steps in a respective one of the plurality of processing groups;
generating a progress display image representing a progress of processing of the plurality of information processing steps associated with user input included in each of the plurality of processing groups, where an indication of a level of completion of the plurality of information processing steps within a given one of the plurality of processing groups is determined by reviewing respective progress information data indicating respective completion for each of the plurality of information processing steps within such given one of the plurality of processing groups, and wherein the progress display image updates in response to respective completion of an information processing step associated with user input; and outputting and displaying a screen in which the progress display image for each of the plurality of processing groups is arranged at each predetermined position in one screen; and wherein each of the plurality of processing groups comprises a number of information processing steps associated with the user input, wherein the progress display image is divided into a plurality of equal portions corresponding to the number of information processing steps, and wherein each portion of the plurality of equal portions sequentially updates in response to respective completion of each information processing step.

14. The non-transitory, computer readable storage medium according to claim 13, wherein the computer program further causes the computer to perform steps comprising:

selecting a processing group from the plurality of processing groups in the processing order and processes at least some of the plurality of information processing steps included in the selected processing group in the selection order according to the step execution order rule, wherein:

when a progress of processing of at least some of the plurality of information processing steps included in a processing group selected prior to a processing group to be selected is not completed according to the processing order, a selection of the processing group to be selected is not performed.

* * * * *